W. H. HORN.
COTTON-PRESS.
No. 182,365. Patented Sept. 19, 1876.
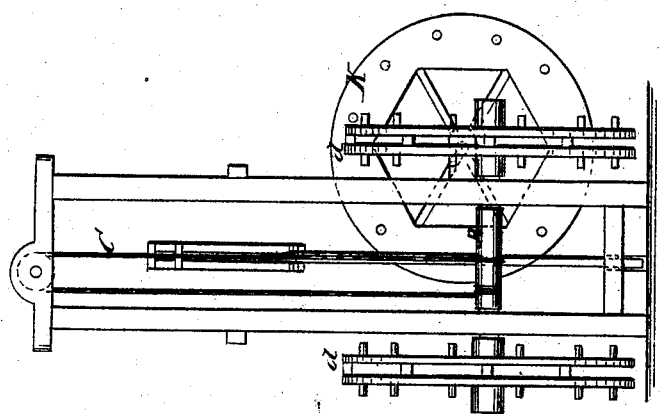
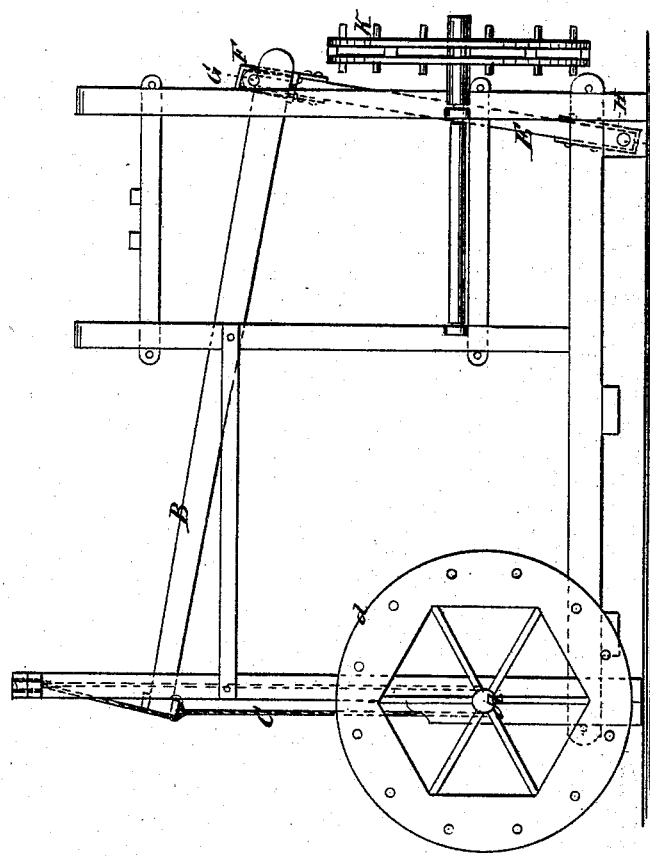
WITNESSES:
E. Wolff
John Goethals
INVENTOR:
W. H. Horn
BY
ATTORNEYS.

UNITED STATES PATENT OFFICE.

WILLIAM H. HORN, OF SAN AUGUSTINE, TEXAS.

IMPROVEMENT IN COTTON-PRESSES.

Speccifiation forming part of Letters Patent No. 182,365, dated September 19, 1876; application filed March 6, 1876.

*To all whom it may concern:*

Be it known that I, WILLIAM H. HORN, of San Augustine, in the county of San Augustine and State of Texas, have invented a new and Improved Cotton-Press, of which the following is a specification:

My invention relates to the press on which a Patent (No. 150,573) was granted May 5, 1874, to William B. Hollowell; and it consists of a duplicate master-wheel on the drum for working the follower; also, an improved contrivance for connecting the pitman to the lever and to its pivot, whereby the machine is rendered more efficient, and may be made lighter for a given strength.

The invention will first be described in connection with the drawing, and then pointed out in claim.

Figure 1 is a side elevation of my improved machine, and Fig. 2 is an end elevation of the same.

Similar letters of reference indicate corresponding parts.

To the drum A, which works the lever B by the rope C, I now propose to apply two master-wheels, $d$, for working it, instead of one, as heretofore, whereby I obtain more leverage with the same size of wheel, and the drum works without any cramping in the bearings, thus making the machine more efficient than with one wheel only. I connect the lever B to the pitman E by the pin G, above the lever, and the stirrup F, going around the pivot. I also apply the stirrup H around the pivot I of the pitman, whereby much greater strength is secured, so that the pitman may be made much lighter than in the machines as heretofore made. I also propose to increase the dimensions of wheel K for raising the follower in about the proportion of six to ten, for making it sufficiently powerful to tamp the cotton successfully by hand.

Having thus described my invention, I claim as new and desire to secure by Letters Patent—

The combination of drum A, connected with lever B by rope, and provided with two master-wheels, of the pitman E, connected with lever B by a pin, G, and stirrups G H, as and for the purpose specified.

WILLIAM HENRY HORN.

Witnesses:
B. F. BLOUNT,
W. H. CROUCH.